US008785832B2

(12) United States Patent
Ikeda (10) Patent No.: US 8,785,832 B2
(45) Date of Patent: Jul. 22, 2014

(54) SOLID-STATE IMAGING APPARATUS HAVING A COMPARATOR COMPARING A GENERATED REFERENCE SIGNAL WITH AN ANALOG SIGNAL FROM A PIXEL AND ITS DRIVING METHOD

(75) Inventor: Yasuji Ikeda, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 327 days.

(21) Appl. No.: 13/415,529

(22) Filed: Mar. 8, 2012

(65) Prior Publication Data

US 2012/0261552 A1 Oct. 18, 2012

(30) Foreign Application Priority Data

Apr. 7, 2011 (JP) .................................. 2011-085565

(51) Int. Cl.
*H01L 27/00* (2006.01)
(52) U.S. Cl.
USPC .................................... 250/208.1; 250/214 R
(58) Field of Classification Search
USPC ........ 250/208.1, 214 R, 214.1; 348/294–311; 341/161–169, 155, 156; 257/290–294, 257/440
See application file for complete search history.

(56) References Cited

U.S. PATENT DOCUMENTS

| 7,567,280 | B2 | 7/2009 | Muramatsu et al. | 348/294 |
| 8,314,868 | B2 * | 11/2012 | Yamamoto | 348/294 |
| 2008/0231330 | A1 | 9/2008 | Takahashi et al. | 327/137 |

FOREIGN PATENT DOCUMENTS

JP 2006-340044 A 12/2006

* cited by examiner

*Primary Examiner* — Que T Le
(74) *Attorney, Agent, or Firm* — Fitzpatrick, Cella, Harper & Scinto (57) ABSTRACT

A solid-state imaging apparatus has: output lines connected commonly to each column of a plurality of pixels; a reference signal generating circuit for generating a reference signal voltage changing in a ramp shape; a comparator for comparing the reference signal voltage with an analog voltage on the output line; and a counter unit for counting, as a digital value, a period from a start of the comparing of the comparator until an inversion of an output signal of the comparator, wherein the reference signal generating circuit sets the reference signal voltage into an offset voltage, thereafter, an input terminal of the comparator is reset, thereafter, the reference signal generating circuit resets the reference signal voltage from the offset voltage into a initial voltage, and thereafter, the reference signal generating circuit generates the ramp-shaped reference signal voltage from the initial voltage, so that the comparator starts the comparing.

8 Claims, 5 Drawing Sheets

SOLID-STATE IMAGING APPARATUS HAVING A COMPARATOR COMPARING A GENERATED REFERENCE SIGNAL WITH AN ANALOG SIGNAL FROM A PIXEL AND ITS DRIVING METHOD

BACKGROUND OF THE INVENTION

1. Field of the Invention

The present invention relates to a solid-state imaging apparatus and a driving method thereof.

2. Description of the Related Art

In recent years, a CMOS image sensor of a column A/D (column parallel A/D) type in which A/D (analog-to-digital) converters are arranged correspondingly to each of columns to pixels arranged in a matrix shape has been used as a solid-state imaging apparatus. There is an A/D converting technique which is used in the column A/D. For example, there is an A/D converting technique called an integrating type or a ramp comparing type in which an analog signal is compared with a reference signal changing in a slope, a counting process is executed in parallel with the comparing process, and a digital signal is obtained based on a count value at a point of time of completion of the comparing process. In the case where a differential comparator is used for the comparing process in the integrating type A/D conversion, by executing a resetting operation of the comparator before a comparing operation, an offset that is caused by a variation in threshold values of transistors can be eliminated. However, there is a problem that if the resetting operation is insufficient, an electric potential at a signal input terminal is out of a range of the reference signal, the comparator is not inverted during the gradual change of the reference signal or is inverted just after a start of the gradual change of the reference signal.

According to the technique disclosed in the Official Gazette of Japanese Patent Application Laid-Open No. 2006-340044, there has been proposed a method whereby, first, a reference signal is input to a differential comparator, a reference signal unit of the reference signal is reset, and thereafter, a current source array for an offset is provided in order to add an offset voltage to the reference signal changing in accordance with time.

However, according to the Official Gazette of Japanese Patent Application Laid-Open No. 2006-340044, there is such a problem that a circuit scale is large. This is because the current source array for the offset, for changing the reference signal of the differential comparator to a predetermined voltage after the resetting, is necessary apart from a current source array, for a slope which is used for the comparing with the analog signal at the time of the A/D conversion. Since a start voltage of the reference signal is started from a voltage changed by the current source array for the offset, there is a case where noises or a voltage fluctuation of the current source array for the offset appears as noises which are common in each column.

SUMMARY OF THE INVENTION

According to one aspect of the present invention, a solid-state imaging apparatus comprises: a pixel region wherein a plurality of pixels outputting an analog signal by photoelectric conversion are arranged in a two dimensional matrix; a plurality of output lines, each arranged correspondingly to each of columns in the pixel region, and connected commonly to the pixels in a same column; a reference signal generating circuit for generating a reference signal voltage changing in accordance with time; a comparator for comparing the reference signal voltage with the analog signal outputted via the output line from the pixel; and a counter for counting, as a digital value, a period from a start of the comparing by the comparator until an inversion of an output signal from the comparator, wherein the reference signal generating circuit sets the reference signal voltage at an offset voltage, thereafter, an input terminal of the comparator is reset, thereafter, the reference signal generating circuit resets the reference signal voltage from the offset voltage into an initial voltage, and thereafter, the reference signal generating circuit generates the reference signal voltage starting from the initial voltage, so that the comparator starts the comparing.

Since the offset voltage can be added to the reference signal voltage by a simple circuit construction, an increase in circuit size can be prevented and the analog voltage can be compared with the reference signal voltage changing in a ramp shape within the proper voltage range. Since the reference signal voltage can be generated from the stable initial voltage, an increase in noises which are common in each column can be prevented.

Further features of the present invention will become apparent from the following description of exemplary embodiments with reference to the attached drawings.

DESCRIPTION OF THE EMBODIMENTS

First Embodiment

Figure 1:
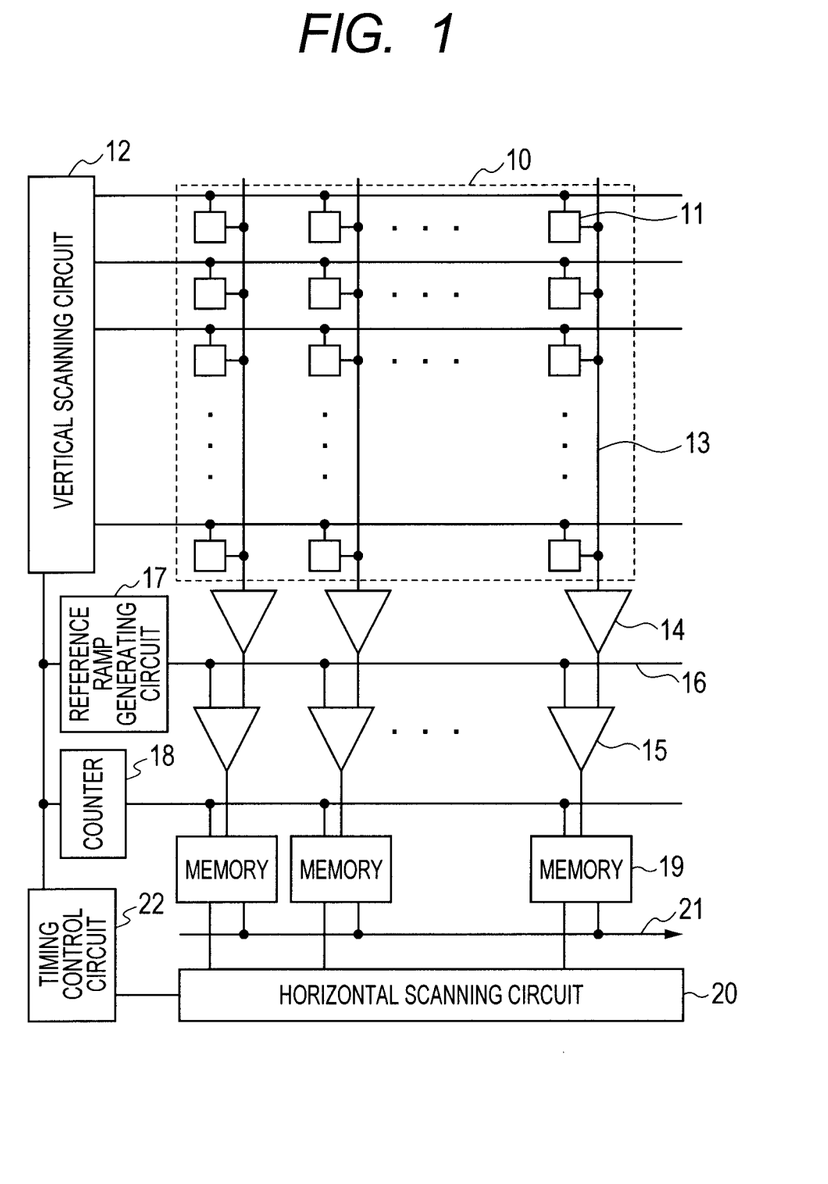
FIG. 1 is a block diagram illustrating a constructional example of a solid-state imaging apparatus according to the first embodiment.

FIG. 1 is a block diagram illustrating a constructional example of a solid-state imaging apparatus according to the first embodiment of the invention. An image region 10 has a plurality of pixels 11 arranged in a two dimensional matrix. Each of the plurality of pixels 11 has a photoelectric converting unit such as a photodiode or the like and a transistor and outputs an analog signal by photoelectric conversion. The pixels 11 are connected to a vertical scanning circuit 12 correspondingly to each of rows of the matrix and outputs an analog signal corresponding to a light reception amount by a control signal from the vertical scanning circuit 12. Each of vertical output lines 13 is provided correspondingly to each of columns of the plurality of pixels 11 and is connected commonly to the plurality of pixels 11 in a same column. The analog signals generated from the pixels 11 are output to the vertical output line 13 which is common correspondingly to each of columns. The vertical output line 13 is connected to an analog signal processing unit 14 arranged correspondingly to each of columns of the plurality of pixels 11. The analog signal processing unit 14 executes processes such as CDS (correlated double sampling), amplification, and the like to the analog signal which was input. The analog signal processing unit 14 may be a buffer circuit or it does not necessarily include the buffer circuit. If the buffer circuit is not used, the CDS process is executed in an input portion of a comparator 15. An output terminal of the analog signal processing unit 14 is connected to one end of an input terminal of the comparator 15. The other end of the input terminal of the comparator 15 is connected to a reference signal generating circuit 17 through a reference signal line 16. The reference signal generating circuit 17 generates a reference signal voltage changing in a ramp shape. The comparator 15 compares the reference signal voltage which is generated by the reference signal generating circuit 17 with the analog voltage which is input from the vertical output line 13 through the analog signal processing unit 14. An output terminal of the comparator 15 is connected to a memory 19. The memory 19 holds a value of a counter 18 at a point of time when an output signal of the comparator 15 has been inverted. A counter unit has the counter 18 and the memory 19 and counts a period of time, as a digital value, from a start of the comparing by the comparator 15 until an inversion of the output signal of the comparator 15. The value held in the memory 19 is output to a horizontal transfer line 21 by a control signal of a horizontal scanning circuit 20. Each of the vertical scanning circuit 12, reference signal generating circuit 17, counter 18, and horizontal scanning circuit 20 is controlled by a timing control circuit 22.

Figure 2:
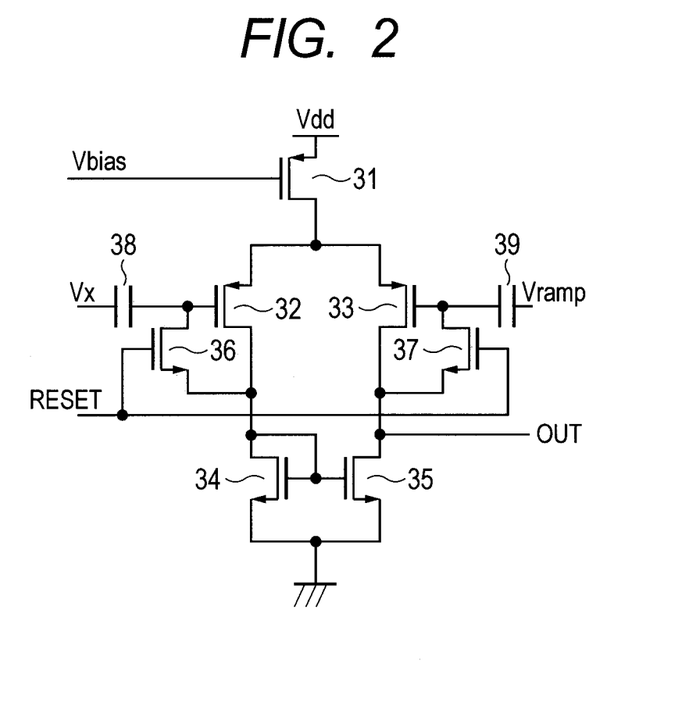
FIG. 2 is a diagram illustrating an example of a specific circuit of a comparator.

FIG. 2 is a diagram illustrating an example of a specific circuit of the comparator 15 in FIG. 1. The comparator 15 is a comparator of a differential construction. Hereinbelow, a P-channel MOS field effect transistor is referred to as a PMOS and an N-channel MOS field effect transistor is referred to as an NMOS. A PMOS 31 is a source-grounded current source in which a gate is connected to a node of a bias electric potential Vbias and a source is connected to a node of a power source voltage Vdd. A drain of the PMOS 31 is connected to sources of PMOSs 32 and 33. Drains of the PMOSs 32 and 33 are connected to drains of NMOSs 34 and 35. Sources of the NMOSs 34 and 35 are connected to a common ground voltage node and gates are connected to the drain of the NMOS 34. Gates of the PMOSs 32 and 33 are connected to capacitors 38 and 39, respectively. The other terminals of the capacitors 38 and 39 are connected, as input terminals of the comparator 15, to an output terminal of the analog signal processing unit 14 and an output terminal of the reference signal generating circuit 17, respectively. A voltage Vx is an output voltage of the analog signal processing unit 14 in FIG. 1. A voltage Vramp is an output voltage of the reference signal generating circuit 17. The gates and drains of the PMOSs 32 and 33 are connected to drains and sources of NMOSs 36 and 37, respectively. Gates of the NMOSs 36 and 37 are connected to a node of a reset pulse signal RESET. When a high-level pulse of the reset pulse signal RESET is input, the NMOS 36 short-circuits a circuit between the gate and drain of the PMOS 32 and the NMOS 37 short-circuits a circuit between the gate and drain of the PMOS 33, thereby resetting a voltage at the input terminal of the comparator 15, respectively. An offset component of a gate voltage of each of the PMOSs 32 and 33 is cancelled and both of the gate voltages are set to an almost same voltage. An output terminal OUT is connected to the drain of the NMOS 35.

Figure 3:
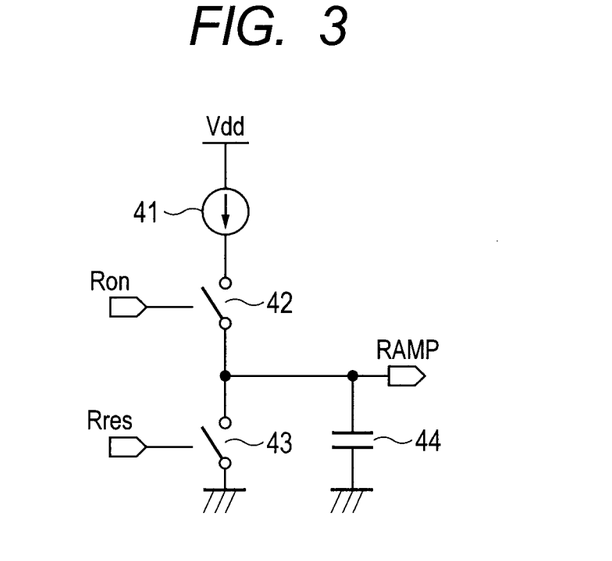
FIG. 3 is a diagram illustrating an example of a reference signal generating circuit in the first embodiment.

FIG. 3 is a diagram illustrating an example of the reference signal generating circuit 17 in FIG. 1. The reference signal generating circuit 17 illustrated in FIG. 3 is an example and the reference signal generating circuit is not limited to it. It is sufficient that the reference signal generating circuit 17 has such a circuit construction that a reference voltage unit of the reference signal voltage Vramp is formed during a time change of the reference signal voltage Vramp. A terminal RAMP is an output terminal of the reference signal generating circuit 17 and its voltage is equal to Vramp. A first current source 41 is connected to the node of the power source voltage Vdd and generates a constant current. A first switch 42 is connected between the first current source 41 and a terminal (reference signal line 16) RAMP of the reference signal voltage Vramp and is provided between the first current source 41 and a capacitor 44. The capacitor 44 and a second switch 43 are connected in parallel between the terminal RAMP of the reference signal voltage Vramp and the ground voltage node. The capacitor 44 stores a charge from the first current source 41. The second switch 43 allows the charge storing in the capacitor 44 to be discharged. The capacitor 44 may be arranged in the reference signal generating circuit 17 or arranged correspondingly to each of the columns. Signals Ron and Rres are signals to control the first switch 42 and the second switch 43, respectively. When the signals Ron and Rres are at the high level, the switches are turned on, respectively. When the signals Ron and Rres are at the low level, the switches are turned off, respectively. At the start of the generation of the reference signal voltage Vramp, when the signal Ron is set to the high level and the first switch 42 is turned on, the charge is transferred from the first current source 41 and stored into the capacitor 44, so that the reference signal voltage Vramp is generated. When the signal Ron is set to the low level and the first switch 42 is turned off, the voltage Vramp of the reference signal line 16 in the OFF state is held and becomes the reference voltage unit of the reference signal voltage Vramp. When the signal Rres is set to the high level and the second switch 43 is turned on, the voltage Vramp of the reference signal line 16 is reset to the ground voltage. Although a connecting destination of the second switch 43 and the capacitor 44 has been set to the ground voltage node in the embodiment, it is not limited to such a node so long as a stable electric potential is obtained. Owing to such a simple circuit construction that the first switch 42 is provided between the first current source 41 and the capacitor 44 as mentioned above, a reference signal unit for the offset can be easily formed in the reference signal voltage Vramp. If the signal which is input to the comparator 15 has negative characteristics, such characteristics that the reference signal voltage Vramp also decreases are obtained. In such a case, the circuit of FIG. 3 may be designed by replacing the power source voltage Vdd and the ground voltage.

Figure 4:
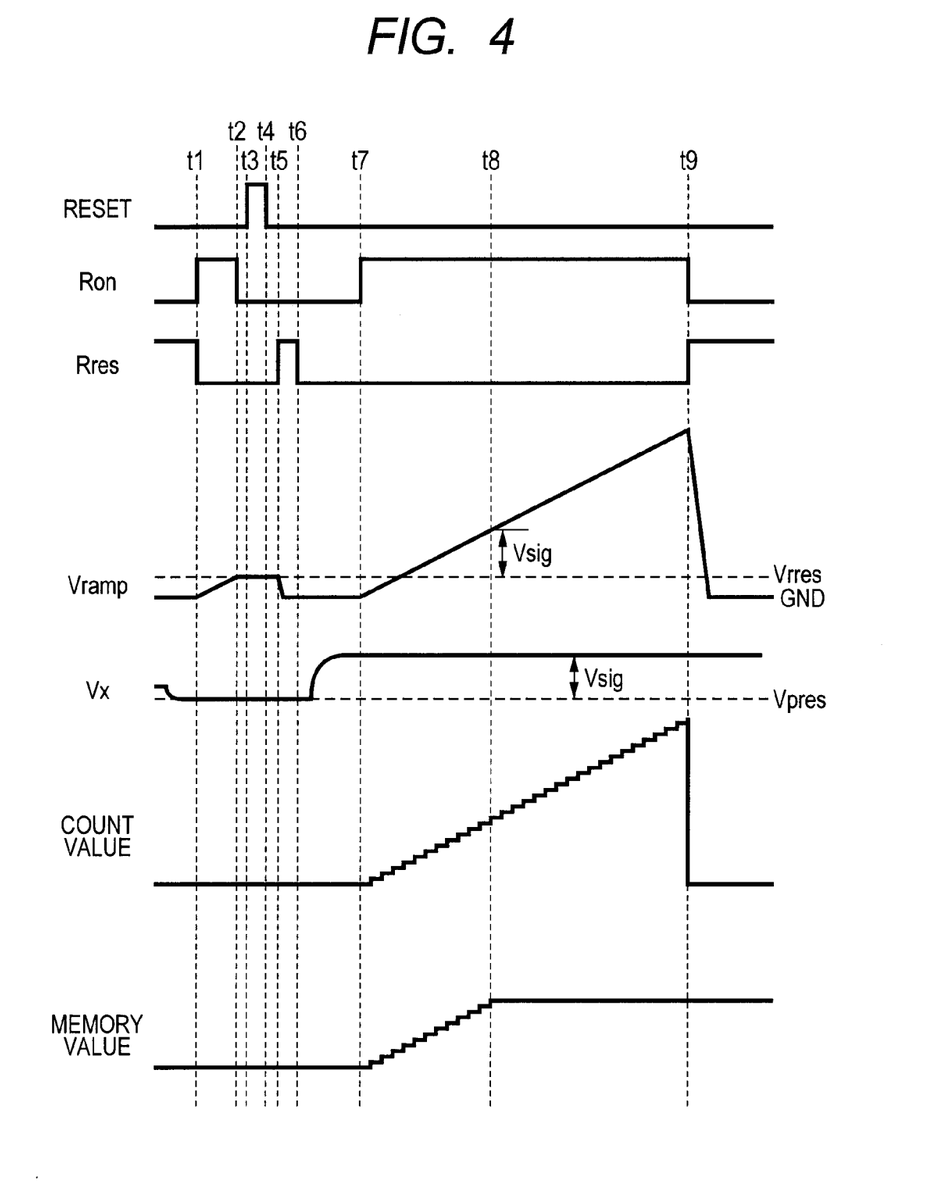
FIG. 4 is a diagram illustrating a driving method of the first embodiment.

FIG. 4 is a diagram illustrating a driving method of the solid-state imaging apparatus according to the first embodiment of the invention. The signal RESET is a reset signal of the comparator 15 which is generated by the timing control circuit 22 in FIG. 1. The signals Ron and Rres are signals to control the reference signal generating circuit 17 in FIG. 3. The voltage Vramp is a voltage of the reference signal line 16. The voltage Vx is an analog signal voltage which is output by the analog signal processing unit 14. The voltages Vramp and Vx are input to the comparator 15, respectively. The count value is an output value of the counter 18. The memory value is a value which is held in the memory 19. In the embodiment, at time t1 when the voltage Vx is a reset voltage Vpres of the pixel 11, the signal Ron of the reference signal generating circuit 17 is set to the high level, thereby allowing the voltage Vramp to be changed in a ramp shape. After that, at time t2 when the voltage Vramp becomes a voltage Vrres serving as a halfway electric potential of the ramp operation, the signal Ron is set to the low level and the first switch 42 is turned off, thereby maintaining the voltage Vramp to the offset voltage Vrres. The capacitor 44 holds the offset voltage Vrres. After that, at time t3, the signal RESET is set to the high level and the NMOSs 36 and 37 are turned on, thereby executing the resetting operation of the comparator 15. That is, the comparator 15 is set in such a manner that the inverting operation is executed when Vramp−Vrres=Vx−Vpres. The comparator 15 is set in such a manner that even if a variation remains in the gate voltage of each of the PMOSs 32 and 33 at the time of the resetting operation of the comparator 15 for a period of time from time t1 to time t2, such a voltage Vrres that the comparator 15 executes the inverting operation during the comparing operation is set. At time t4, the signal RESET is returned to the low level and the resetting operation of the comparator 15 is finished. At time t5, the signal Rres of the reference signal generating circuit 17 is set to the high level and the voltage Vramp of the reference signal line 16 is reset to a ground voltage GND. After that, at time t6, the signal Rres is returned to the low level. At time t7 after the voltage Vx was changed to an output voltage according to incident light of the pixel 11, the signal Ron of the reference signal generating circuit 17 is set to the high level, thereby allowing the voltage Vramp to be changed in the ramp shape and allowing the counting operation of the counter 18 to be started. At time t8, Vramp−Vrres=Vx−Vpres=Vsig (signal component voltage) and the comparator 15 executes the inverting operation and generates an output signal. The memory 19 inputs the output signal and holds the count value obtained at time t8. The memory value is equal to a value obtained by converting Vsig+Vrres from an analog value into a digital value. By subtracting the offset component Vrres, a result in which the voltage Vsig has been converted from an analog value into a digital value is obtained. After that, at time t9, by setting the signal Ron into the low level and setting the signal Rres into the high level, the reference signal voltage Vramp is reset to the ground voltage GND and the count value is also reset.

As mentioned above, for a time interval between time t1 and time t2, the reference signal generating circuit 17 sets the reference signal voltage Vramp from the ramp start voltage (ground voltage), or an initial voltage, GND into the offset voltage Vrres. After that, for a time interval between time t3 and time t4, the input terminal of the comparator 15 is reset. After that, for a time interval between time t5 and time t6, the reference signal generating circuit 17 resets the reference signal voltage Vramp from the offset voltage Vrres into the ramp start voltage (ground voltage) GND. After that, for a time interval between time t7 and time t9, the reference signal generating circuit 17 generates the ramp-shaped reference signal voltage Vramp in a period from the ramp start voltage (ground voltage) GND to a ramp termination voltage and the comparator 15 starts the comparing operation. Thus, at the reset voltage of the comparator 15, the offset voltage Vrres can be added to a reset voltage at the gate of the PMOS 33. Consequently, an increase in circuit size that is caused by use of a voltage changing unit can be prevented, the reference signal can be started from a stable electric potential which does not depend on the voltage changing unit, and an increase in noises which are common in each column can be prevented. Particularly, by setting the ramp start voltage of the reference signal voltage Vramp into the ground voltage GND, the ramp operation can be always started from the stable electric potential in which a fluctuation and noises are small, and the noises which are common in each column can be reduced. The ramp start voltage is not limited to the ground voltage GND but a similar effect can be obtained even by the power source voltage Vdd. Even if an inclination of the reference signal voltage Vramp is changed in order to change a gain of the A/D conversion, the re-adjusting operation of the reset voltage Vrres may be omitted. If the reset voltage Vrres of the comparator 15 is equal to a specific voltage, a conversion value at the time when the analog signal voltage Vx is equal to the voltage Vpres is changed by an inclination of the reference signal. Further, when the inclination of the ramp is reduced, a range of the voltage Vsig decreases. Therefore, when the inclination of the reference signal voltage Vramp is changed, it is also necessary to adjust the reset voltage Vrres of the comparator 15 again. However, by generating the voltage Vrres by using the reference signal generating circuit 17, the voltage Vrres also changes in accordance with the change in inclination of the reference signal voltage Vramp. The conversion value at the time when the analog signal voltage Vx is equal to the voltage Vpres is always constant. Therefore, the adjustment of the voltage Vrres may be omitted.

Second Embodiment

Figure 5:
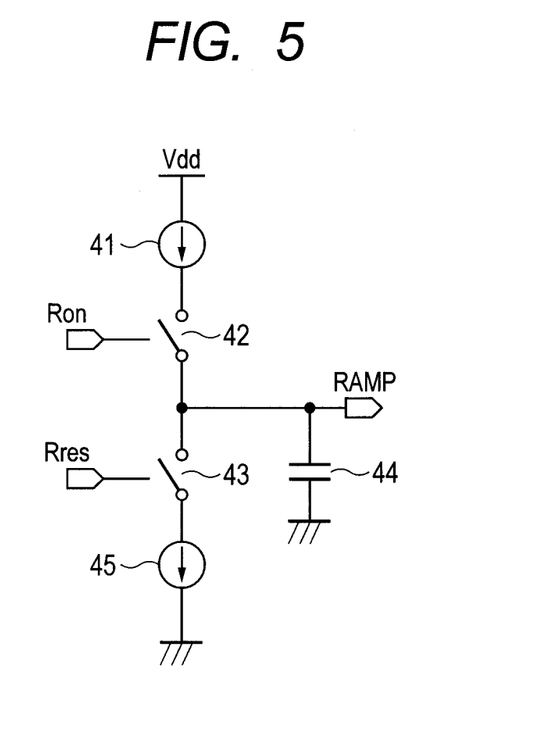
FIG. 5 is a diagram illustrating an example of a reference signal generating circuit according to the second embodiment.

A construction of a solid-state imaging apparatus and an example of the comparator 15 according to the second embodiment of the invention are substantially the same as those of the first embodiment. The second embodiment will be described hereinbelow with respect to points different from the first embodiment. FIG. 5 is a diagram illustrating an example of the reference signal generating circuit 17 (FIG. 1) according to the second embodiment of the invention. The circuit of FIG. 5 is obtained by adding a second current source 45 for subtracting the charge from the capacitor 44 to the circuit of FIG. 3. Between the terminal RAMP of the reference signal voltage Vramp and the ground voltage node, the second current source 45 is serially connected to the second switch 43. Although the second current source 45 is added in order to subtract the charge from the capacitor 44 at a predetermined rate in the second embodiment, it is not always necessary to add the second current source 45 so long as the reference signal voltage Vramp can be shifted to the ramp start voltage (ground voltage) GND by subtracting the charge from the capacitor 44.

Figure 6:
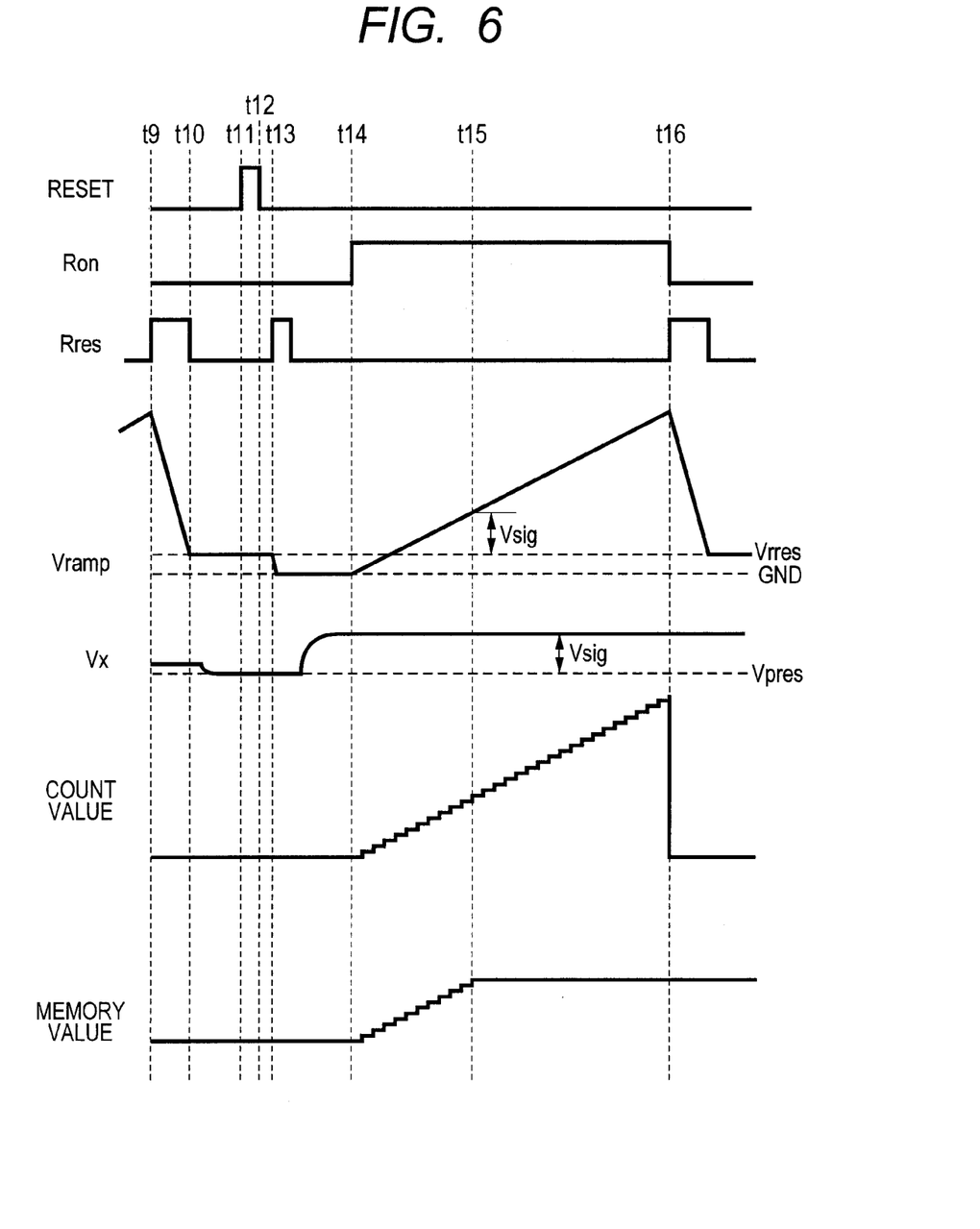
FIG. 6 is a diagram illustrating a driving method of the second embodiment.

FIG. 6 is a diagram illustrating a driving method of the solid-state imaging apparatus according to the second embodiment of the invention. At time t9 in a state where the reference signal voltage Vramp is equal to the ramp termination voltage, the signal Rres is set to the high level, the second switch 43 is turned on, and the resetting of the reference signal voltage Vramp is started. At time t10 when the voltage Vramp before the resetting is perfectly finished is set to the voltage Vrres, the signal Rres is set to the low level, the second switch 43 is turned off, and the resetting operation is temporarily stopped. After that, at time t11 for a time interval during which the voltage Vx is equal to the reset signal voltage Vpres of the pixel 11, the signal RESET is set to the high level, the NMOSs 36 and 37 are turned on, and the resetting operation of the comparator 15 is executed. That is, the comparator 15 is set so that the inverting operation is executed when Vramp−Vrres=Vx−Vpres. At time t12, the signal RESET is returned to the low level, thereby terminating the resetting operation of the comparator 15. At time t13, the signal Rres is set to the high level again, thereby perfectly resetting the reference signal voltage Vramp into the ground voltage GND. At time t14 after the voltage Vx was changed to the output voltage according to the incident light of the pixel 11, the signal Ron of the reference signal generating circuit 17 is set to the high level, the first switch 42 is turned on, the voltage Vramp is changed in a ramp shape, and the counting operation of the counter 18 is started. At time t15, Vramp−Vrres=Vx−Vpres=Vsig (signal component voltage) and the comparator 15 executes the inverting operation and generates the output signal. The memory 19 inputs the output signal of the comparator 15 and holds the count value obtained at time t15. The memory value is equal to a value obtained by converting Vsig+Vrres from the analog value into the digital value. By subtracting the offset component Vrres, a result in which the voltage Vsig has been converted from the analog value into the digital value is obtained. After that, at time t16, by setting the signal Ron into the low level and setting the signal Rres into the high level, the reference signal voltage Vramp is reset to the electric potential Vrres and the count value is also reset.

As mentioned above, for a time interval between time t9 and time t10, the reference signal generating circuit 17 sets the reference signal voltage Vramp from the ramp termination voltage into the offset voltage Vrres before the resetting of the input terminal of the comparator 15 for a time interval between time t11 and time t12. In the second embodiment, in a manner similar to the first embodiment, at the reset voltage of the comparator 15, the offset voltage Vrres can be added to the reset voltage at the gate of the PMOS 33 without using the voltage changing unit. Thus, an increase in circuit size that is caused by use of the voltage changing unit can be prevented, the reference signal can be started from the stable electric potential which does not depend on the voltage changing unit, and the increase in noises which are common in each column can be prevented. Although the output signal of the pixel 11 has been A/D converted only once in both of the first and second embodiments, the invention is not limited to such a construction. For example, it is also possible to execute such a CDS (correlated double sampling) process that the reset signal of the pixel 11 is A/D converted, thereafter, the signal of the pixel 11 according to the incident light is A/D converted, and a difference between the digital signals obtained by the A/D conversion of two times is output.

According to the first and second embodiments, since the offset voltage can be added to the reference signal voltage by the simple circuit construction, the increase in circuit size can be prevented and the analog voltage Vx can be compared with the reference signal voltage which changes in the ramp shape within a proper voltage range. Since the reference signal voltage can be generated from the stable ramp start voltage, the increase in noises which are common in each column can be prevented.

The foregoing embodiments merely show the specific examples when embodying the invention and the technical scope of the invention should not be limitedly interpreted by them. That is, the invention can be embodied in various forms without departing from its technical idea or its main features.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-085565, filed Apr. 7, 2011, which is hereby incorporated by reference herein in its entirety.

What is claimed is:

1. A solid-state imaging apparatus comprising:
a pixel region wherein a plurality of pixels each outputting an analog signal by photoelectric conversion is arranged in a two dimensional matrix;
a plurality of output lines, each arranged correspondingly to each of columns of the pixel region, and connected commonly to the pixels in a same column;
a reference signal generating circuit for generating a reference signal changing in accordance with time;
a comparator for comparing the reference signal with the analog signal outputted via the output line from the pixel; and
a counter for counting, as a digital value, a period from a start of the comparing by the comparator until an inversion of an output signal from the comparator, wherein
the reference signal generating circuit sets the reference signal at an offset voltage, thereafter, an input terminal of the comparator is reset, thereafter, the reference signal generating circuit resets the reference signal from the offset voltage into an initial voltage, and thereafter, the reference signal generating circuit generates the reference signal starting from the initial voltage, and the comparator starts the comparing.

2. The solid-state imaging apparatus according to claim 1, wherein
the reference signal generating circuit sets the reference signal voltage from the initial voltage into the offset voltage, before the reset of the input terminal of the comparator.

3. The solid-state imaging apparatus according to claim 1, wherein
the reference signal generating circuit sets the reference signal voltage from a ramp termination voltage into the offset voltage, before the reset of the input terminal of the comparator.

4. The solid-state imaging apparatus according to claim 1, wherein
the reference signal generating circuit includes a capacitor for holding the offset voltage.

5. The solid-state imaging apparatus according to claim 1, wherein
the reference signal generating circuit includes:
a first current source;
a capacitor for storing a charge from the first current source;
a first switch provided between the first current source and the capacitor;
a second switch for discharging the charge stored in the capacitor.

6. The solid-state imaging apparatus according to claim 5, wherein
the reference signal generating circuit includes a second current source connected serially to the second switch.

7. The solid-state imaging apparatus according to claim 1, wherein
the initial voltage is a ground voltage, or a power source voltage.

8. A driving method of a solid-state imaging apparatus, wherein the apparatus comprises:
a pixel region wherein a plurality of pixels outputting an analog signal by photoelectric conversion are arranged in a two dimensional matrix;
a plurality of output lines, each arranged correspondingly to each of columns in the pixel region, and connected commonly to the pixels in a same column;
a reference signal generating circuit for generating a reference signal voltage changing in accordance with time;
a comparator for comparing the reference signal voltage with the analog signal outputted via the output line from the pixel; and
a counter for counting, as a digital value, a period from a start of the comparing by the comparator until an inversion of an output signal from the comparator, wherein
the method comprises steps of:
setting the reference signal voltage at an offset voltage;
resetting an input terminal of the comparator;

resetting the reference signal voltage from the offset voltage into an initial voltage, and thereafter, generating the reference signal voltage starting from the initial voltage; and starting the comparing by the comparator.

* * * * *